United States Patent [19]
Pelletier

[11] Patent Number: 5,217,104
[45] Date of Patent: Jun. 8, 1993

[54] DEVICE FOR DEVIATING OBJECTS TRAVELING ON A CONVEYOR

[75] Inventor: Jean P. Pelletier, Saint Leger Sous Cholet, France

[73] Assignee: Fabrication Industrielle de Material pour les Entreprises, Le Rion En Mauges, France

[21] Appl. No.: 811,427

[22] Filed: Dec. 20, 1991

[30] Foreign Application Priority Data

Dec. 21, 1990 [FR] France ............................... 90 16073

[51] Int. Cl.[5] ............................................ B65G 47/34
[52] U.S. Cl. .................................... 198/367; 198/372
[58] Field of Search ............... 198/364, 367, 370, 372, 198/367.1

[56] References Cited

U.S. PATENT DOCUMENTS

| 2,998,117 | 8/1961 | Newburn | 198/367 |
|---|---|---|---|
| 3,026,988 | 3/1962 | Fisk | 198/372 X |
| 3,276,563 | 10/1966 | Fitzgerald et al. | 198/367 |
| 4,298,117 | 11/1981 | Kobayashi et al. | 198/367 |
| 4,643,291 | 2/1987 | Counter et al. | 198/372 |
| 4,711,357 | 12/1987 | Langenbeck et al. | 198/367 X |
| 4,850,471 | 7/1989 | Annas, Sr. et al. | 198/372 X |
| 5,010,998 | 4/1991 | MacMillen | 198/367 X |
| 5,101,983 | 4/1992 | Scata | 198/370 X |

FOREIGN PATENT DOCUMENTS

| 2620036 | 11/1977 | Fed. Rep. of Germany | 198/367 |
|---|---|---|---|
| 3918196 | 8/1990 | Fed. Rep. of Germany | 198/367.1 |
| 1358813 | 3/1964 | France | 198/372 |
| 0036820 | 3/1983 | Japan | 198/367 |
| 0901193 | 2/1982 | U.S.S.R. | 198/367 |

Primary Examiner—D. Glenn Dayoan
Assistant Examiner—James R. Bidwell
Attorney, Agent, or Firm—Darby & Darby

[57] ABSTRACT

A device for deviating objects moving on a conveyor (13) in a direction (F) has a deflecting arm (1) passing from an inactive position to an active position in which it is transverse to the conveyor (13) by a combined movement during which it moves in the same direction (F) as the conveyor (13) while pivoting on itself. The device has two arms (1, 2) articulated one on the other—a first, deflecting (1), articulated at the end (8) of a second, carrying arm (2). The second arm (2) is directed in an opposite sense to the displacement (F) of the conveyor (13), being carried by a vertical drive shaft (12), situated on the side of the conveyor (13), this shaft driving it in rotation either in one direction or in the other. The end (1a) of the first arm (1) is guided in a track (3, 4) forcing it to move along the conveyor (13).

7 Claims, 8 Drawing Sheets

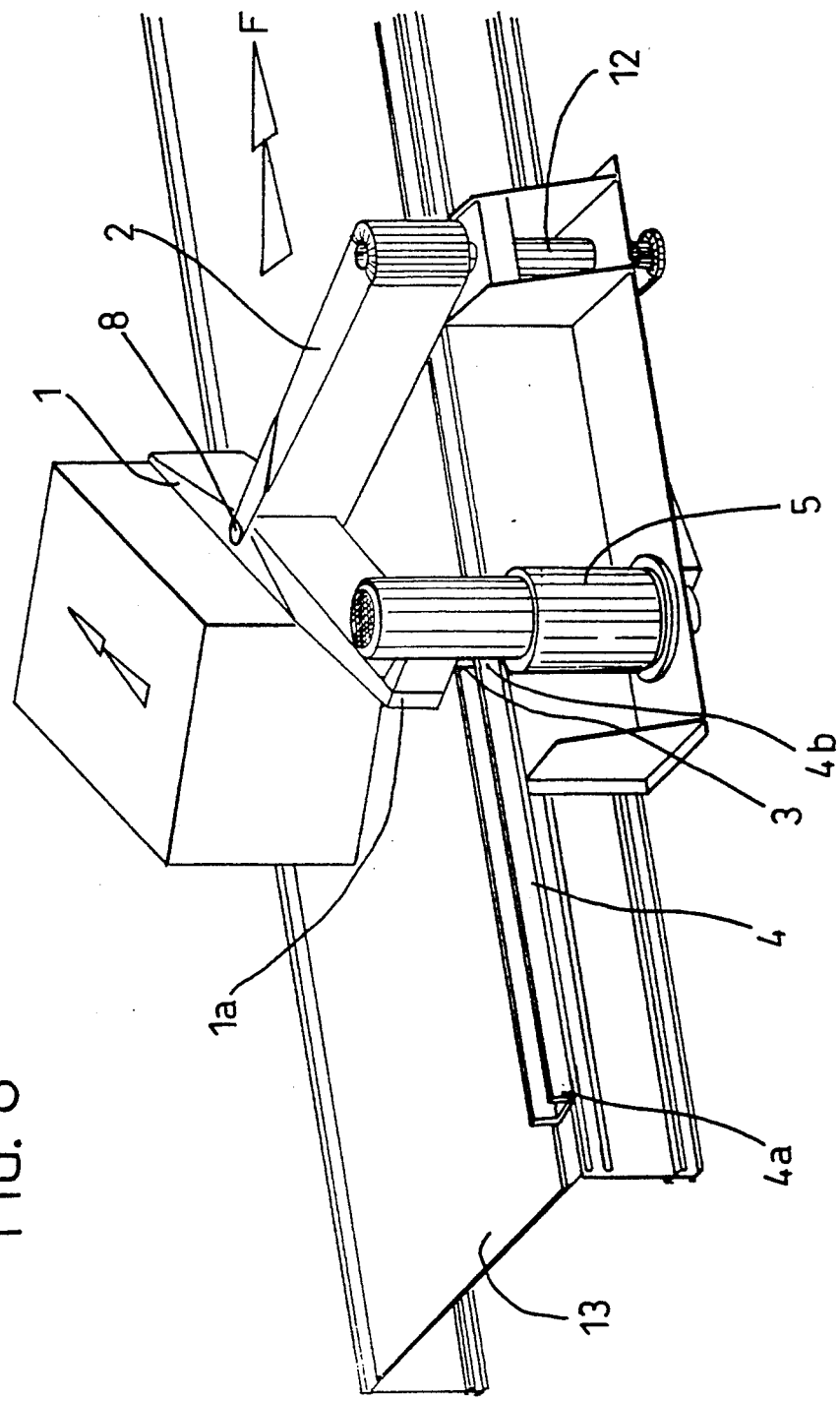

DEVICE FOR DEVIATING OBJECTS TRAVELING ON A CONVEYOR

BACKGROUND OF THE INVENTION

The present invention relates to a device for deviating parcels or various objects traveling on conveyors, whether these are band, belt, roll, roller or other conveyors.

For deviating parcels or the like traveling on a conveyor to send them onto another conveyor forming an angle with the first, there is used until now a rotary arm pivoting on a vertical axis situated on the side of the conveyor, this arm being actuated (by any appropriate control means) so as to place itself at 45° to the direction of advance of the parcels, thereby causing them to deviate.

This arrangement presents the following disadvantages: When the deflecting arm moves from the inactive position toward the active position, its movement occurs in the opposite direction to that of the movement of the parcels, so that, to compensate this unfortunate relative motion, the deflecting arm must be given a high speed of rotation. If the deflecting arm is taken into use at the moment when the parcel reaches its level, this high speed of the deflecting arm imparts considerable accelerations to the parcel, which in some cases are incompatible with the fragility of the products. Besides, the force necessary for pushing the parcel away is high. As a result, the operating rates of the installations that must handle parcels of 80 to 100 cm on a side are limited to about 3,600 parcels per hour (one parcel per second), whereas it is desirable to be able to operate at higher speeds without maltreating the parcels.

To try to solve the problems of impacts of the deflecting arm against the parcels, devices have been proposed already in which said deflecting arm is taken along in a movement combining a longitudinal displacement in the running direction of the conveyor and a movement of rotation bringing the arm transversely to said conveyor.

Such devices are described for example in the documents FR 69 38558, DE 26 20 036, DE 27 28 669 and GB 2 223 730.

In FR 69 38558, the device includes a curved deflecting arm, one of the ends of which is guided along a straight slide disposed parallel to the conveyor, while the other end moves above the conveyor.

In a first form of realization, the deflecting arm is pulled by a manipulating rod attached on the side of the conveyor opposite that on which the deflecting arm is located. The manipulating rod is in the form of an inverted U and straddles said conveyor.

Such an arrangement cannot be used for deviating big parcels because of the placement of the manipulating rod above the conveyor.

This arrangement, therefore, can not readily be used in a sorting installation intended to handle parcels that may have such large dimensions as 1 m by 1 m by 1.2 m, as is now often required.

This document proposes a second device that solves the problem of the overall dimension in that it is entirely situated on one and the same side of the conveyor; the deflecting arm is then guided by two rails on which slide sleeves carried by said arm.

It has been found that in parcel-deviating devices using curved deflecting arms the parcel comes in contact with the arm by one of its corners, which brings about rather heavy impacts that may deteriorate its contents.

This is why in the other documents cited above flat deflecting arms have been used, able to apply against a face of the parcel to turn it aside without harsh impact.

At present there is a need for parcel-deviating devices able to work with parcels which may have dimensions as large as those defined above, and may weigh up to 70 kg.

The devices situated on one side only of the conveyor known from the cited documents do not have the mechanical strength necessary for the deviation of such parcels.

BRIEF DESCRIPTION OF THE INVENTION

The invention therefore aims to propose a deviation device working indiscriminately for very bulky and heavy parcels and for parcels of small size, for example 200 mm by 200 mm by 30 mm, weighing 0.5 kg.

The deviation device according to the invention is of the kind having a deflecting arm that passes from an inactive position to an active position in which it is transverse to the conveyor by a combined movement during which it moves in the same direction as the conveyor while pivoting on itself, and is characterized by the fact that it has of two arms articulated on each other—a first, deflecting arm articulated on a second, carrying arm. The said second arm is directed oppositely to the displacement of the conveyor, being mounted pivotally on a vertical axis situated on the side of the conveyor. The end of the first arm is guided by means forcing it to move along the conveyor; in such a way that when the device is in inactive position, the two arms are disposed one against the other, on the side of the conveyor, when it is in active position the two arms forming an angle with one another, the first arm being transverse to the conveyor forming with it an angle of about 45°.

The invention may also include the following arrangements:

a) the carrying arm is moved in an alternating rotary movement by a motor always running in the same direction through a transmission of the connecting rod/crank type.

b) the guiding of the end fixed by the deflecting arm occurs either along a straight line parallel to the side of the deflector, or along a slightly curved line.

BRIEF DESCRIPTION OF THE DRAWINGS

By way of non-limiting examples and to facilitate comprehension of the invention, the annexed drawings show FIG. 1, a view from above, in perspective, of a first embodiment of the invention, in its two extreme positions;

FIGS. 7 and 8 are two views in perspective showing the operation of another embodiment of the invention.

DETAILED DESCRIPTION OF THE INVENTION

Figure 1:
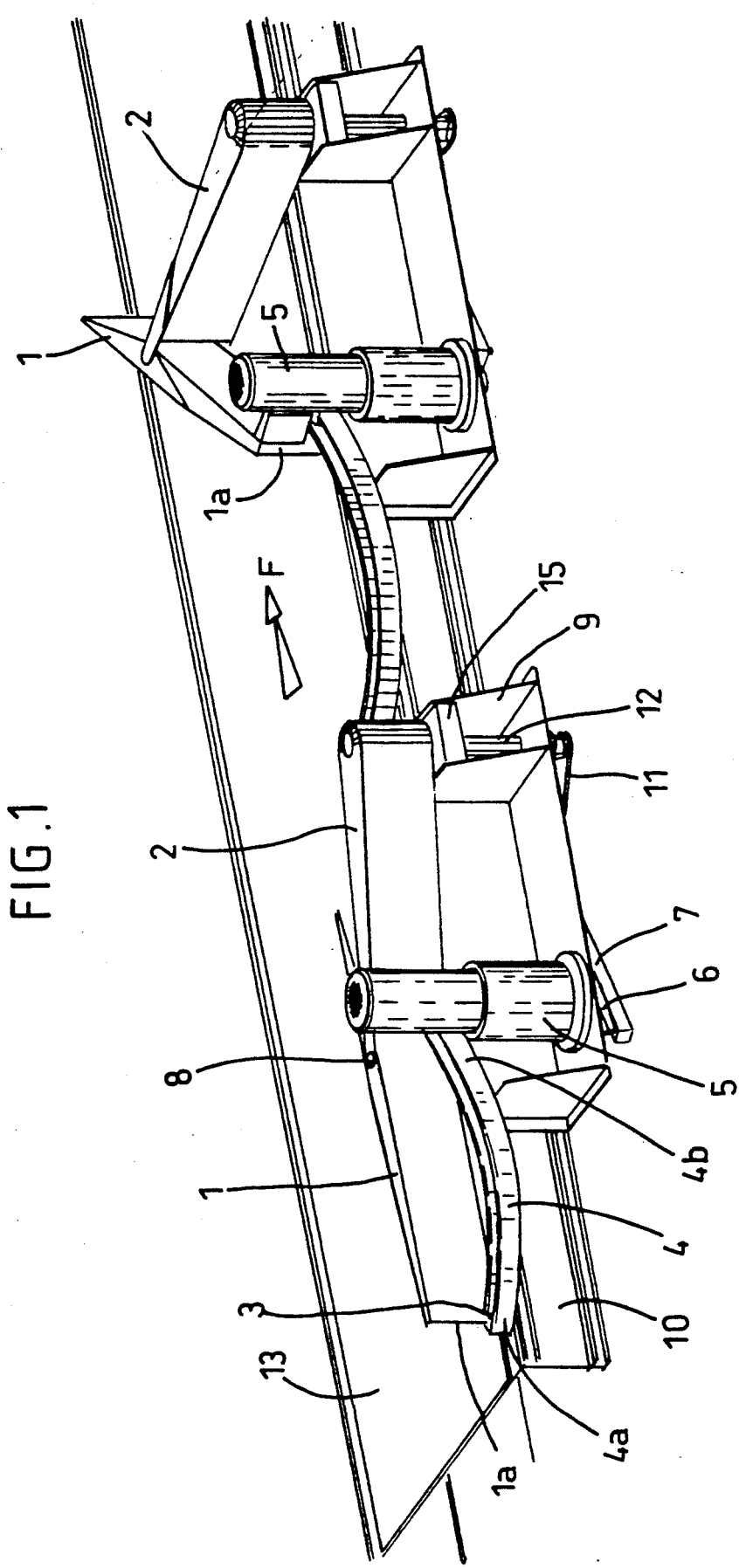
Figure 2:
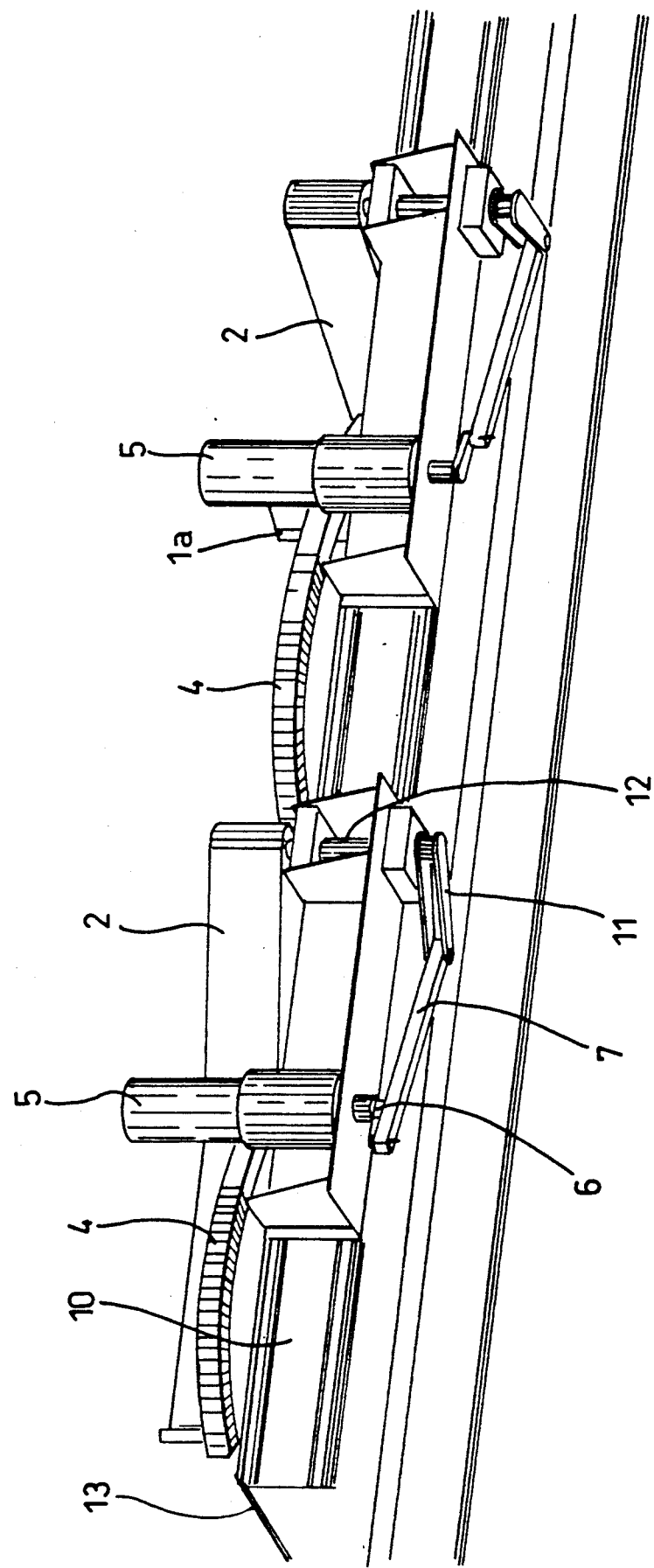
FIG. 2, a view from below, in perspective, of the device of FIG. 1.

Referring to FIGS. 1 and 2, it can be seen that according to a first embodiment the device consists of two arms 1 and 2 articulated to each other on the vertical axis 8. Arm 1 is the deflecting arm and arm 2 is the carrying arm. The carrying arm 2 is secured to a vertical shaft 12, situated on the side of the conveyor 13. Shaft 12 is driven in an alternating movement of rotation by a crank 6 and two connecting rods 7 and 11. When crank 6 is driven in rotation by the motor 5, connecting rod 7 is urged in an alternating movement which it transmits to connecting rod 11 which drives shaft 12 in rotation now in one direction, now in the other. Arm 2 can thus occupy two positions-an inactive position, in which it is practically parallel to conveyor 13 being directed in a direction opposite the direction of movement F thereof (FIGS. 1, 2, 5) and an active position (FIG. 6) in which it is transverse to conveyor 13 forming with it an acute angle of less than 90° (of the order of 60° in the example shown). When arm 2 pivots to go from the inactive position to the active position, its end, which carries the axis of articulation 8, describes an arc of circle which goes in the same direction as F.

As can be seen in the figures, the device according to the invention is disposed entirely along the conveyor on one side only thereof. Such an arrangement permits avoiding all risk of wedging of the parcels when being deviated toward another conveyor. It also allows a greater number of discharge conveyors to be provided toward which the parcels must be deviated along the side of the conveyor opposite the device.

The deflecting arm 1 is, on the one hand, articulated to arm 2 by the vertical axis 8, and on the other hand, guided at its end 1a by means of a roller 3 which runs in a race 4. This race 4 runs along the conveyor 13, it may be rectilinear but is preferably slightly curved with its starting point 4a and its point of arrival 4b substantially on a straight line situated on the side of the conveyor 13 and parallel to the direction F of movement of said conveyor.

Figure 5:
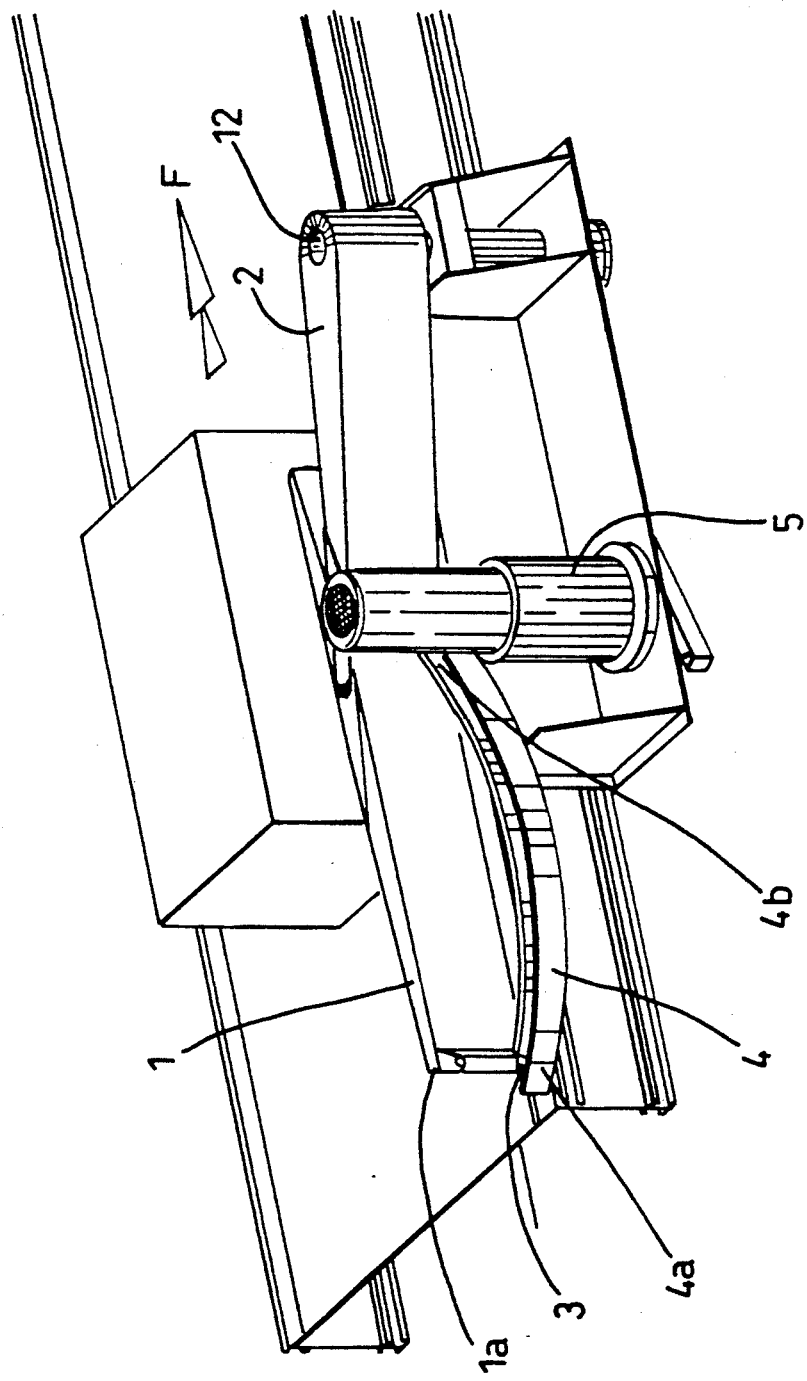
FIGS. 5 and 6, two views in perspective illustrating the operation of the invention.
Figure 6:
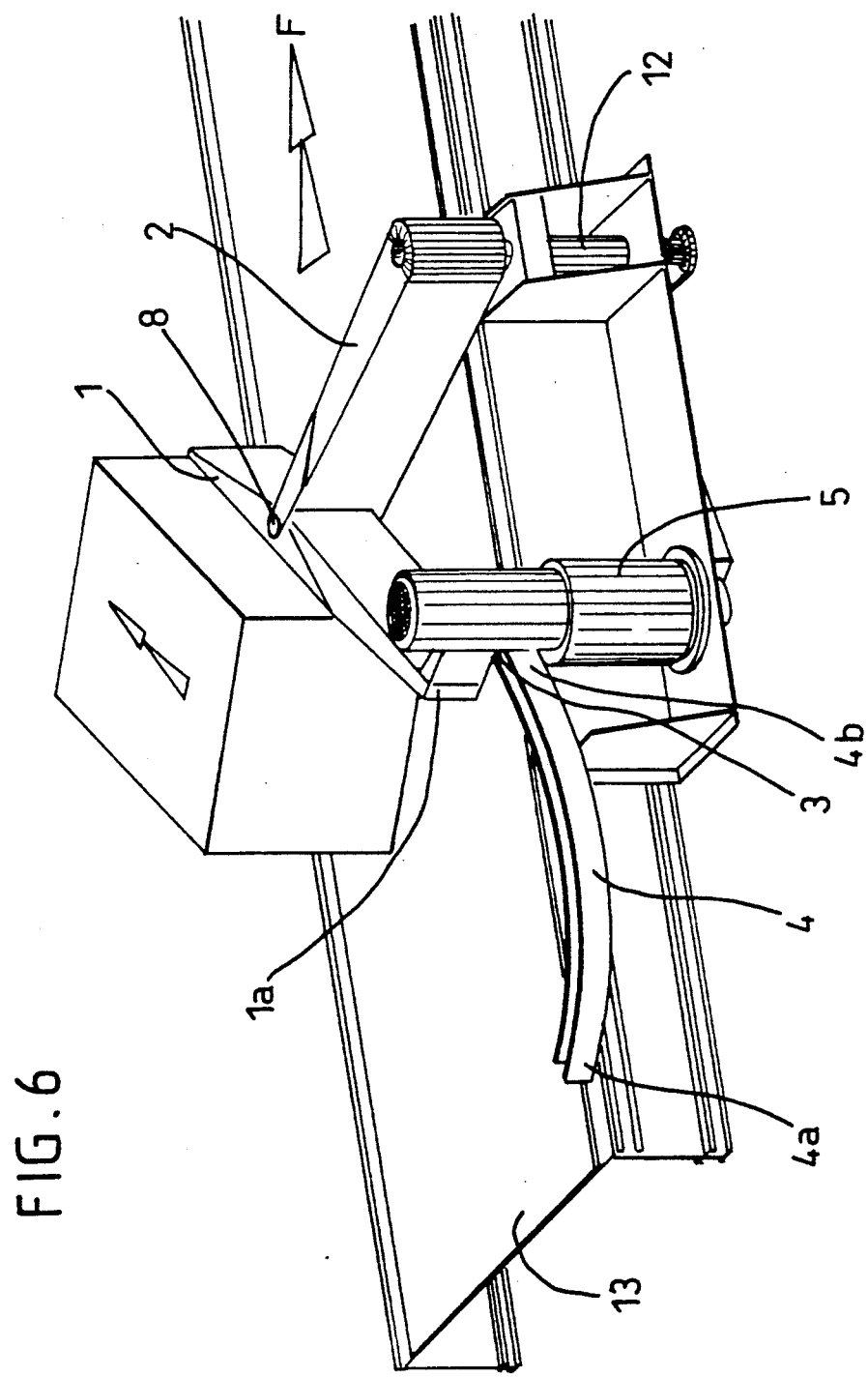

When shaft 12 is set in motion, arm 2 goes from the initial inactive position, represented in FIG. 5, to the final active position represented in FIG. 6. The point of articulation 8 of the two arms 1 and 2 describes an arc of circle, while the end 1a of the deflecting arm 1 follows the race to go from 4a to 4b. As a result, the deflecting arm 1 moves in a combined movement in the course of which it moves according to the arrow F while pivoting on itself so as to be transverse to conveyor 13 at about 45°.

The use of a curved race permits obtaining the passage of the deflecting arm 1 from its inactive position to its active position over a shorter distance which makes it possible to execute a complete movement of deviation of a parcel and return to inactive position in a very short time.

The conveyor according to the invention is thus able to deviate 5000 parcels per hour, the time needed for the deviation of a parcel and for return of the device to inactive position is about 0.4 second.

Figure 3:
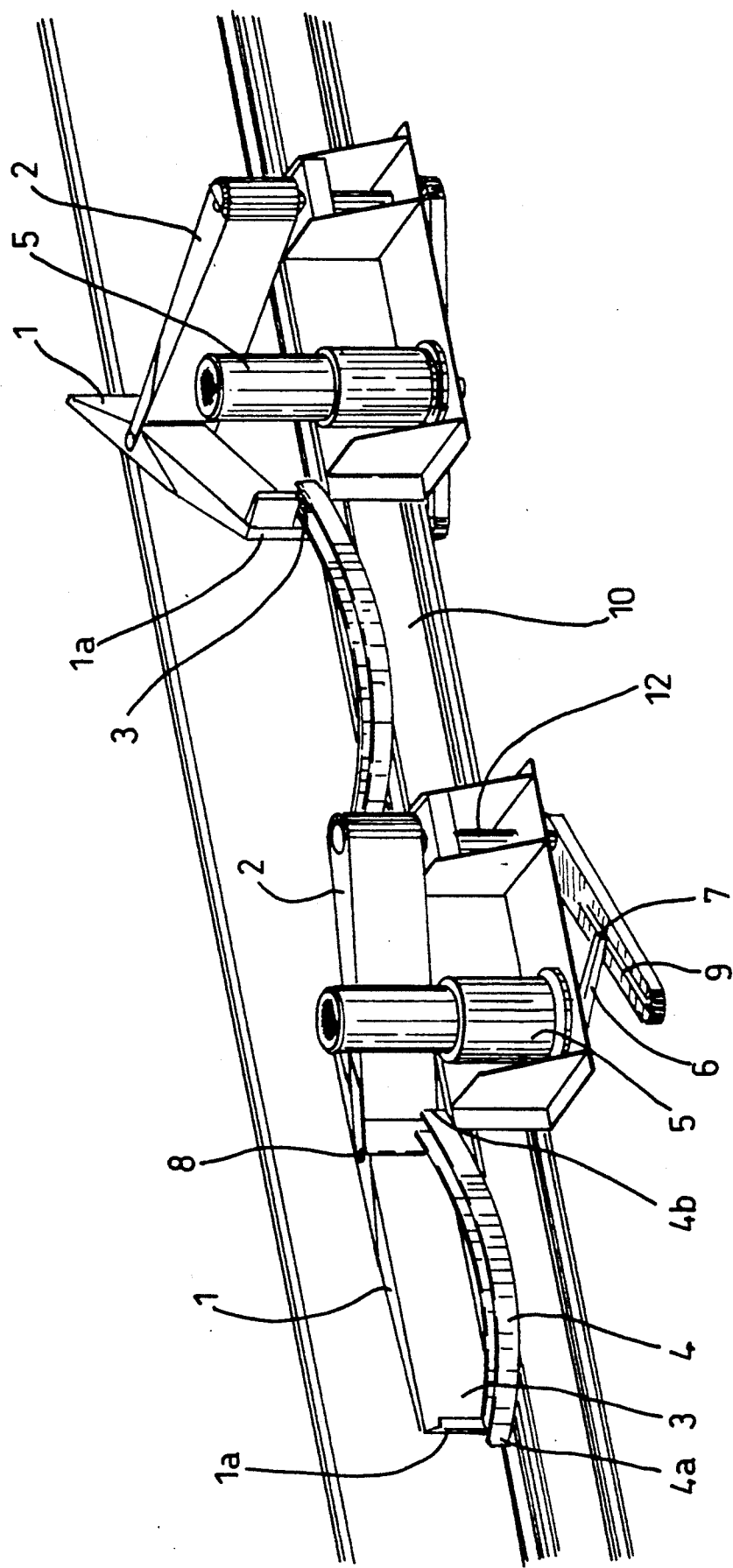
FIG. 3, a view from above, in perspective, of a second embodiment in its two extreme positions.
Figure 4:
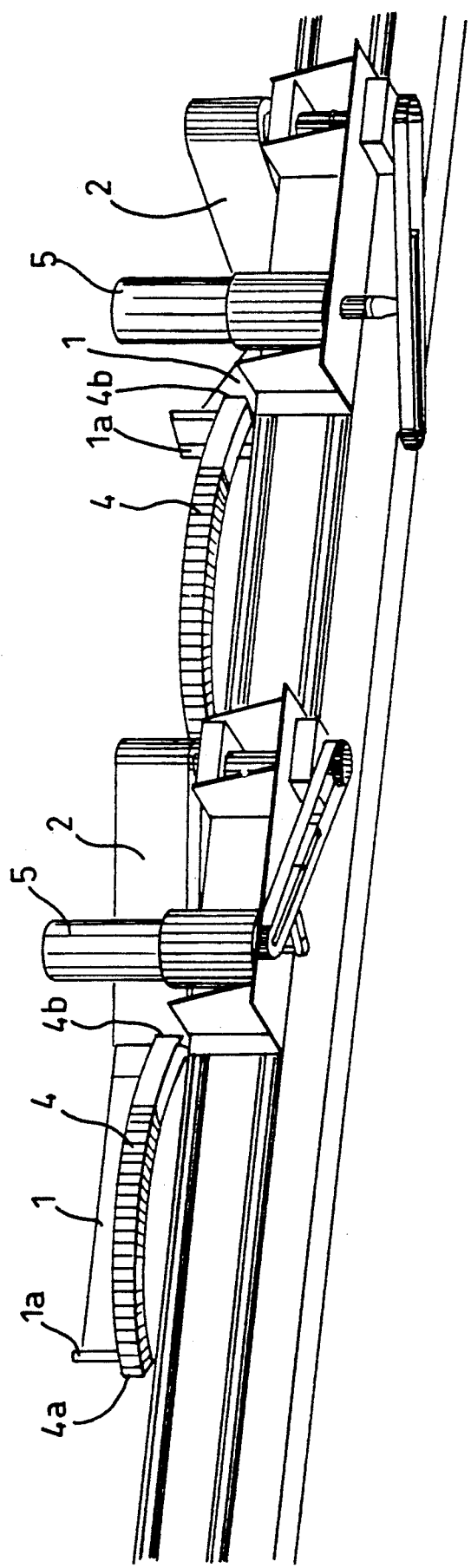
FIG. 4, a view from below of FIG. 3.

FIGS. 3 and 4 are analogous to FIGS. 1 and 2 and the same elements bear the same references. The only difference derives from the drive mechanism of shaft 12 by the motor 5. In this arrangement, the connecting rod 11 is eliminated, the end of crank 6 moving in a window or groove 9 taken out in the connecting rod 7 which is secured directly on the axle 12. The functioning is identical to that of FIGS. 1 and 2.

The carrying arm 2 used in the device according to the invention plays two most interesting roles. This carrying arm 2 ensures the displacement of the deflecting arm by pulling it at a point of its length so that it slides in the race. Such a traction movement permits avoiding the problems of wedging that may occur in such sliding. Besides, the carrying arm 2 is disposed in back of the deflecting arm 1 during the deviation of a parcel and holds it firmly counter to the forces exerted by the parcels moving on the conveyor forming a knuckle. The device according to the invention can then manipulate parcels weighing from 0.5 to 70 kg.

Preferably, as is represented in FIGS. 5 and 6, the deviation device is actuated when the parcel is at the level of arm 1; the latter then comes to apply against the parcel and deviates it while accompanying it in its movement along F; and then, the parcel having been discharged laterally of the conveyor 13, the arms 1 and 2 return to their starting position awaiting the next parcel.

For the deviation of the parcel, the deflecting arm 1 applies over its entire plane against a face of the parcel thereby avoiding impacts and making the device usable for the deviation of fragile parcels, for example parcels containing computer equipment.

In either case, the deviation devices according to the invention are driven by a motor 5 always running in the same direction, each movement of deviation of a parcel and return to inactive position is then made by starting the motor once only.

Figure 7:
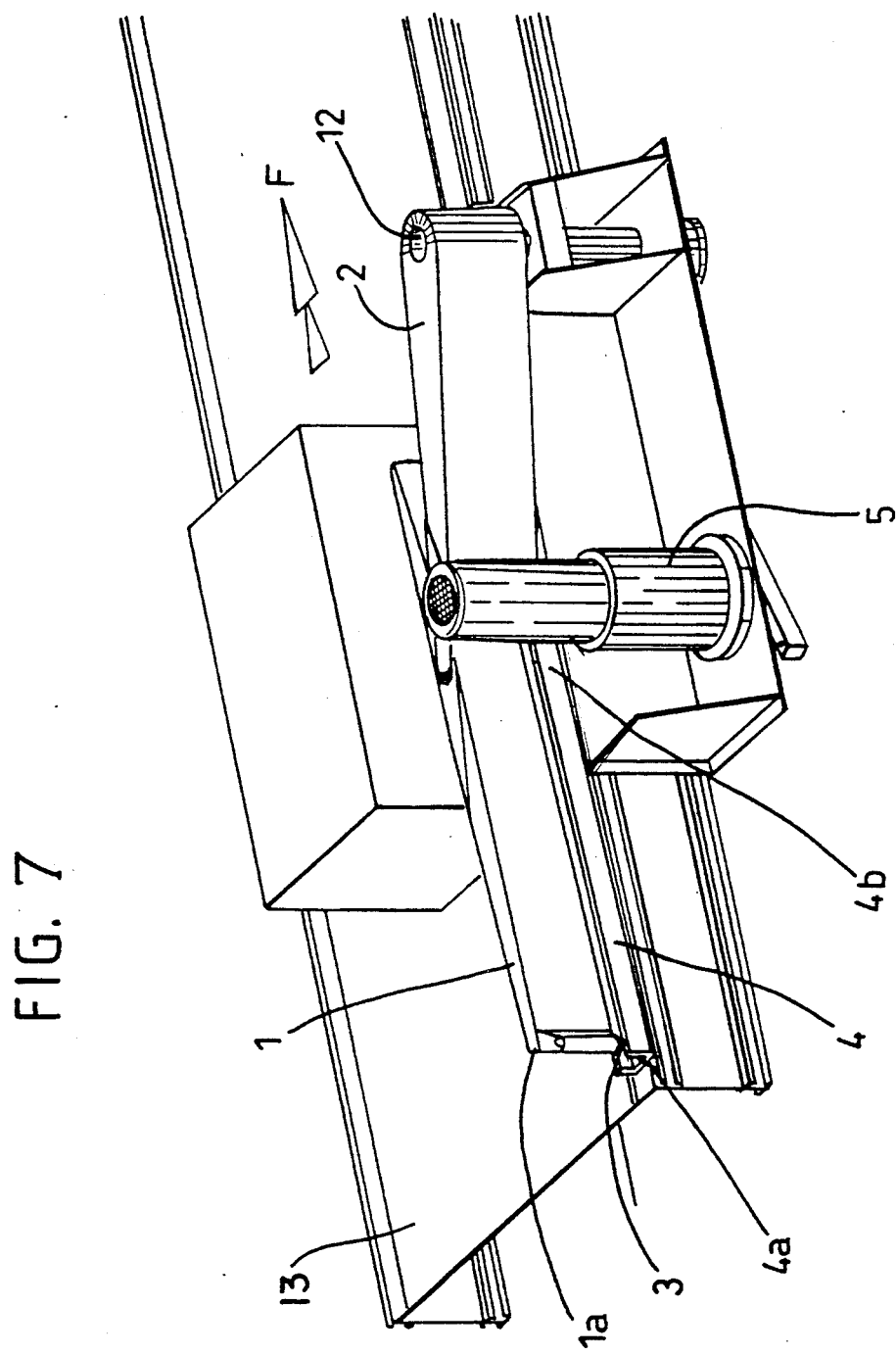

FIGS. 7 and 8 show another embodiment of the invention. Here, the track 4 for guiding the end 3 of the deflecting arm 1 is linear rather than curved as in the other embodiments. Otherwise, the operation of the invention is the same as previously described.

Advantageously, owing to the arrangement of the invention, the deflecting arm starts its movement at zero speed. It therefore starts up gently allowing to arrive at low speed against the parcel to be deviated, and then it accelerates in the course of its movement toward its active position, decelerates upon approaching its active position before returning toward its inactive position again accelerating in the course of movement to decelerate on arrival at the dead point.

I claim:
1. Device for deviating objects moving along a path on a conveyor in a first direction comprising
   a deflecting arm for engaging and deflecting said objects from said path on said conveyor
   means for moving said deflecting arm from an inactive position generally parallel to said path to a second position across the conveyor for engaging an object on said conveyor and deflecting it;
   said moving means comprising:
   a conveying arm having one end on the downstream side of the path and downstream of said deflecting arm mounted to a drive means which pivots said conveying arm;
   means for pivotally connecting the upstream end of said conveying arm to said deflecting arm;
   elongated guide means extending along a part of the length of said conveyor;
   means for mounting the upstream end of said deflecting arm in said guide means for movement therealong;

rotation of said conveying arm by said drive means in a first direction moving the upstream end of said conveying arm across the conveyor and moving by said pivotal connection the upstream end of said deflecting arm in the downstream direction in said guide means while extending said deflecting arm from its inactive position to its active position across the conveyor with said conveying arm and deflecting arm forming an angle.

2. Device according to claim 1 wherein said guide means is rectilinear.

3. Device according to claim 1, wherein said guide means is curved, going from a starting point situated on one side of the conveyor to a point of arrival also situated on the same side of the conveyor.

4. Device according to claim 2 in which said elongated guide means comprises a race and the upstream end of the deflecting arm carries a roller, rolling in said race.

5. A device as in claim 1 wherein rotation of said conveying arm in a second direction opposite to said first direction moving the upstream end of said conveying arm downstream to a position generally parallel to the conveyor and moving the upstream end of said deflecting arm upstream in said guide means to its inactive position.

6. Device as in claim 1 wherein said drive means comprises a motor having an output shaft rotating in a first direction and a connecting rod/crank assembly between said motor and said downstream end of said conveying arm for moving said conveying arm in opposite directions.

7. Device as in claim 6 wherein said drive means comprises a motor having an output shaft rotating in a first direction and a connecting rod/crank assembly between said motor and said downstream end of said conveying arm for moving said conveying arm in opposite directions.

* * * * *